United States Patent Office 3,579,491
Patented May 18, 1971

3,579,491
METHOD FOR PREPARING POLYMERS AND COPOLYMERS OF VINYL CHLORIDE BY BULK POLYMERIZATION AT LOW TEMPERATURE AND PRODUCTS THEREOF
Marc E. Carrega, Chatenay-Malaby, France, assignor to Produits Chimiques Pechiney-Saint-Gobain, Neuilly-sur-Seine, France
No Drawing. Filed Jan. 30, 1969, Ser. No. 795,347
Claims priority, application France, Feb. 7, 1968, 139,017
Int. Cl. C08f 3/30, 15/06
U.S. Cl. 260—85.5    11 Claims

ABSTRACT OF THE DISCLOSURE

The polymerization and copolymerization of vinyl chloride in bulk, in the absence of oxygen and at a temperature within the range of −100° to 20° C. in the presence of a catalytic system comprising an alpha-halogenated diacyl peroxide and an organo aluminum compound.

---

This invention relates to a method for the preparation of polymers and copolymers of vinyl chloride by bulk polymerization at low temperature and to products formed thereof.

It is known that the temperature range capable of use with conventional initiators in the polymerization of unsaturated organic derivatives can be lowered by the addition of organo-metallic components. Thus, the temperature range capable of use with benzoyl peroxide in the polymerization of vinyl chloride can be reduced substantially by the addition of triethyl aluminum. However, it has been noted that free radical initiators are unable, in the presence of organo-metallic compounds, to initiate the bulk polymerization of vinyl chloride at low temperatures at industrially attractive rates of transformation. Thus, initiators which release free radicals, such as diisopropyl peroxy dicarbonate or azobisisobutyronitrile, will not affect the bulk polymerization of vinyl chloride in the presence of triethyl aluminum at a temperature of −15° C., for example, with attractive yields.

It is an object of this invention to provide a method for the polymerization and copolymerization of vinyl chloride in bulk at low temperature with commercially acceptable conversion rates.

Applicant has discovered that the halogenated alpha-diacyl peroxides are able, in the presence of organo aluminum compounds, to initiate the polymerization or copolymerization of vinyl chloride in the bulk at industrially attractive rates of transformation at temperatures which are considerably lower than the usual temperatures. It is known that the usual temperature ranges utilized with alpha-halogenated diacyl peroxides are, for example, on the order of 45° C. for monochloroacetyl peroxide, 20° to 35° C. for chloropropionyl peroxide, and 10° to 25° C. for alpha-chlorocaproyl and alpha-chlorolauroyl peroxides, and from −2° to +12° C. for alpha-alpha-dichloropropionyl peroxide.

In accordance with the practice of this invention, the preparation of polymers and copolymers based on vinyl chloride consists in polymerizing or copolymerizing in bulk a monomer composition based on vinyl chloride, in the absence of oxygen, at a temperature within the range of −100° C. to +20° C., preferably within the range of −80° C. to +10° C., in the presence of a catalyst system formed of: an alpha-halogenated diacyl peroxide having the formula

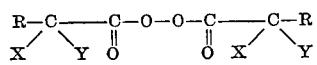

in which X represents a halogen atom such as fluorine, chlorine, bromine or iodine. Y represents hydrogen or a halogen atom such as fluorine, chlorine, bromine or iodine, R represents a hydrogen atom, a saturated aliphatic hydrocarbon radical or an unsaturated aliphatic hydrocarbon radical containing from 1 to 10 carbon atoms, and having eventually one or more different substituents, particularly halogen atoms, a cyclanic, cyclenic, or an aromatic or heterocyclic radical, with or without one or more different substituents, particularly halogen atoms, an organo aluminum compound having the formula

wherein R represents an eventually ramified alcoyl radical containing from 1 to 12 carbon atoms, and $R_2$ and $R_3$ represent a hydrogen, a halogen atom such as fluorine, chlorine, bromine or iodine, or an eventually ramified alcoyl radical containing from 1 to 12 carbon atoms.

Representative of the halogenated alpha-diacyl peroxides which can be used in the catalytic system defined are: monochloroacetyl peroxide, alpha-chlorolauroyl peroxide and the alpha-halogenated peroxides such as used in the preparation of polymers and copolymers in bulk based upon vinyl chloride, as described in my French Pat. No. 1,483,018.

Amongst the previously used alpha-halogenated peroxides described in the French Pat. No. 1,483,018, which can also be used in the practice of this invention, mention may be made of alpha-alpha-dichloropropionyl peroxide and alpha-chlorocaproyl peroxide.

Representative of the organo aluminum compound which can be used in the catalytic systems are triethyl aluminum, tripropyl aluminum, triisobutyl aluminum, triisohexyl aluminum, diethyl aluminum hydride, chlorodiethyl aluminum, dichloromonoethyl aluminum and diisobutyl aluminum hydride.

Representative of the monomers which are copolymerized with vinyl chloride in accordance with the practice of this invention are propylene, ethylene, butene, acrylonitrile, vinyl esters or ethers such as vinyl acetate, vinylidene chloride, styrene and fluoro or fluorochloro substituted derivatives of ethylene, such as trifluorochloroethylene.

In a preferred embodiment of the invention, the halogenated peroxide is employed in proportions, expressed in weight of active oxygen, within the range of 0.0005% to 0.2% and preferably within the range of 0.001% to 0.1% in relation to the amount of monomer; and the organo aluminum compound is employed therewith in proportions, expressed in milliatoms-grams of aluminum, within the range of 0.001 to 50 and preferably within the range of 0.02 to 15 per milliatoms-grams of active oxygen.

It has been found that the best average hourly production of the polymerization or copolymerization of monomer compounds having a vinyl chloride base can be obtained with certain ratio values: milliatoms of aluminum of the organo aluminum compound/milliatoms of active oxygen of the halogenated alpha-peroxide, the value of said relation being a function of the polymerization temperature. Thus, the average hourly output from the polymerization of vinyl chloride in bulk at −40° C., in the presence of the monochloroacetyl triethyl aluminum peroxide system is maximum when the value of the relation defined above is 4; the average hourly output from a similar operation carried out at −20° C., in the presence of the same catalytic system, is maximum when the value of said relation is 4/3.

The above described catalyst system can be used in the bulk polymerization of monomer compounds based upon vinyl chloride by different techniques, such as described in the following French patents:

No. 1,079,772, filed on July 29, 1952
No. 1,257,780, filed on Feb. 26, 1960
No. 1,357,736, filed on Feb. 26, 1963
No. 1,382,072, filed on Mar. 1, 1963
No. 1,436,744 and No. 1,450,464

The present invention also relates to new industrial products, polymers and copolymers based upon vinyl chloride obtained by bulk polymerization in the presence of the catalytic system of this invention. By the practice of the method of this invention, polymers and copolymers of vinyl chloride are obtained which have good heat stability as well as high flexure and softening temperature.

The following examples are given by way of illustration, but not by way of limitation, of the practice of this invention:

EXAMPLE 1

550 grams of liquid vinyl chloride are introduced at a temperature of 20° C. into an autoclave made of glass and stainless steel having a capacity of 1 liter and having an anchor type agitator as well as being jacketed for the circulation of a cooling liquid therethrough. After degassing 50 grams of vinyl chloride, the monomer is cooled to a temperature of —20° C. in an atmosphere of pure nitrogen containing less than 5 p.p.m. volume by oxygen and less than 10 p.p.m. volume by water.

With the aid of a hyprodermic syringe, introduction is made into the autoclave of 5 milliatoms-grams of active oxygen in the form of 2.66 grams of a solution in dimethylphthalate, of monochloroacetyl peroxide, titrating 3 grams of active oxygen per 100 grams of solution. Thereafter, 1.71 grams triethyl aluminum, which corresponds to 15 milliatoms-grams of aluminum, are introduced.

When the transformation rate reaches 20%, after 2 hours and 12 minutes, polymerization is stopped. As a matter of fact, the type of autoclave used does not permit continuation of the polymerization beyond this point because of the blockage of the agitator.

100 grams of resin are recovered, corresponding to a transformation rate of 9.2% per hour.

EXAMPLE 2

Example 1 is repeated but at a temperature of —15° C. instead of —20° C. and with the monochloroacetyl triethyl aluminum peroxide system being replaced with a catalytic system formed of: 1.71 grams triethyl aluminum, corresponding to 15 milliatoms-grams of aluminum, and 3 grams isopropyl peroxy dicarbonate, corresponding to 5 milliequivalents-grams. The polymerization is stopped after 6 hours with a recovery of 3 grams of resin, corresponding to an average hourly output of 0.1%.

EXAMPLE 3

The operation of Example 1 is repeated but at a temperature of —15° C. instead of —20° C. and with the monochloroacetyl triethyl aluminum peroxide system replaced with a catalytic system of 1.71 grams triethyl aluminum, corresponding to 15 milliatoms-grams of aluminum, and 0.825 grams azodiisobutyronitrile, corresponding to 5 milliequivalents-grams. The polymerization is stopped after 6 hours with the recovery of 2 grams of resin, corresponding to an hourly average yield of less than 0.1%.

Examples 1 and 2 clearly show that the temperature of utilization of monochloroacetyl peroxide as a polymerization initiator in bulk of vinyl chloride is close to that of isopropyl peroxy dicarbonate in the absence of an organo aluminum compound but is much more activated by the presence of an organo aluminum compound at low temperature than isopropyl peroxy dicarbonate.

EXAMPLE 4

550 grams of liquid vinyl chloride are introduced at 20° C. into the autoclave of Example 1. After degassing 50 grams of vinyl chloride and cooling of the monomer in nitrogen atmosphere to —20° C., the following ingredients are introduced into the autoclave with the aid of a hypodermic syringe: 5 milliatoms-grams of active oxygen in the form of 2.66 grams of the monochloroacetyl solution used in Example 1 and then 2.97 grams of triisobutyl aluminum, which corresponds to 15 milliatomsgrams of aluminum.

The polymerization is stopped after 2 hours and 36 minutes when the rate of transformation reaches 20° C. 100 grams of resin are recovered, corresponding to an average hourly rate of transformation of 7.7%.

EXAMPLE 5

550 grams of liquid vinyl chloride at 20° C. are placed into the autoclave of Example 1. After degassing 50 grams of vinyl chloride and cooling the monomer in nitrogen atmosphere to 0° C., the following ingredients are introduced into the autoclave with a hypodermic syringe: 1.65 milliatoms-grams of active oxygen in the form of 0.88 grams of monochloroacetyl peroxide solution having the titer indicated in Example 1, and then 0.57 grams triethyl aluminum, which corresponds to 5 milliatoms-grams aluminum.

The operation is stopped after 1 hour and 9 minutes when the rate of transformation reaches 20%. 100 grams of resin are recovered, corresponding to an hourly rate of transformation of 17.6%.

EXAMPLE 6

The polymerization described in Example 5 is carried out at a temperature of —40° C. instead of 0° C. The polymerization is stopped after 6 hours. 18 grams of resin are recovered, corresponding to an average hourly rate of transformation of 0.6%.

EXAMPLE 7

550 grams of liquid vinyl chloride are placed at 20° C. into the autoclave of Example 1. After degassing 50 grams of vinyl chloride and cooling the monomer in a nitrogen atmosphere to —80° C., the following ingredients are introduced into the autoclave with a hypodermic syringe: 12.5 milliatoms-grams of active oxygen in the form of 6.66 grams of the monochloroacetyl peroxide solution of Example 1 and then 5.7 grams triethyl aluminum, which corresponds to 50 milliatoms-grams of aluminum.

The operation is stopped after 6 hours. 3 grams of resin are recovered, corresponding to an average hourly rate of transformation of 0.1%.

EXAMPLE 8

The polymerization reaction carried out in Example 1 is repeated at a temperature of −40° C. instead of _20° C. The polymerization is stopped after 6 hours. 33 grams of resin are recovered, corresponding to an average hourly rate of transformation of 1.1%.

EXAMPLE 9

The polymerization of Example 8 is repeated but without taking into consideration the polymerization in the absence of oxygen. It is noted that the presence of 7.5 milliequivalents-grams of gaseous oxygen causes the average hourly rate of transformation to drop to 0.1%. The weight of resin recovered after 6 hours of polymerization is 3 grams.

EXAMPLES 10 to 19

These examples will show that the best average hourly yields from the polymerization of vinyl chloride at —20° C., in the presence of the monochloroacetyl triethyl aluminum peroxide system, are obtained when the ratio of milliatoms-grams of active oxygen to milliatoms-grams of aluminum (O/Al) is 3/4.

As in Example 1, use is made of 500 grams vinyl chloride subjected to polymerization in an autoclave having a capacity of 1 liter. The polymerization is stopped after 6 hours or when 20% of the vinyl chloride has been polymerized. The results obtained by utilizing the catalyst system mentioned above, with increasing values of O/Al, are hereinafter set forth in Table I.

TABLE I

| Example: | Milliatoms, grams Al | Milliatoms, grams O | Relation O/Al | Average hourly yield |
|---|---|---|---|---|
| 10 | 7.5 | 0.9375 | 1/8 | 0.1 |
| 11 | 3.75 | 0.9375 | 1/4 | 2.75 |
| 12 | 7.5 | 1.875 | 1/4 | 5.33 |
| 13 | 15 | 3.75 | 1/4 | 6.82 |
| 14 | 7.5 | 2.343 | 5/16 | 6.58 |
| 15 | 7.5 | 2.8125 | 3/8 | 6.93 |
| 16 | 7.5 | 3.75 | 1/2 | 7.50 |
| 17 | 7.5 | 5.625 | 3/4 | 8 |
| 18 | 7.5 | 7.5 | 1 | 7.54 |
| 19 | 7.5 | 15 | 2 | 4.29 |

Measurement of the Vicat softening temperature on the resin obtained in Example 16, for example, after washing and drying, shows the Vicat point to be about 95° C. A measurement of the intrinsic viscosity of this same sample, taken in cyclohexanon at 70° C., is 216 ml./gram.

EXAMPLES 20 TO 24

The purpose of these examples is to show that the best average hourly yields of polymerization of vinyl chloride at −40° C., in the presence of monochloroacetyl triethyl aluminum peroxide system, are obtained when the O/Al ratio is 1/4.

These experiments were likewise carried out in an autoclave having a capacity of 1 liter with 500 grams of vinyl chloride and the reaction was stopped after 6 hours or when 20% of the vinyl chloride used had been polymerized.

The results are set forth in Table II.

TABLE II

| Example | Milliatoms, grams Al | Milliatoms, grams O | Relation O/Al | Average hourly yield |
|---|---|---|---|---|
| 20 | 50 | 4.167 | 1/12 | <0.1 |
| 21 | 50 | 8.334 | 1/6 | 2.6 |
| 22 | 30 | 7.5 | 1/4 | 2.78 |
| 23 | 50 | 12.5 | 1/4 | 4.3 |
| 24 | 50 | 16.66 | 1/3 | 2.7 |

EXAMPLE 25

550 grams of liquid vinyl chloride are placed at 20° C. into the autoclave of Example 1. After degassing 50 grams of vinyl chloride and cooling the monomer in nitrogen to −40° C., the following ingredients are introduced into the autoclave with a hypodermic syringe: 16.65 milliatoms-grams active oxygen in the form of 8.86 grams of the monochloroacetyl peroxide solution, having the titer indicated in Example 1, then 9.9 grams triisobutylaluminum, which corresponds to 50 milliatoms-grams of aluminum.

The operation is stopped after 6 hours. 94 grams of resin are recovered, corresponding to an hourly rate of transformation of 3.1%.

EXAMPLE 26

Example 13 is repeated but with the monochloroacetyl triisobutylaluminum peroxide system replaced by the catalyst system formed of 9.9 grams triisobutylaluminum, corresponding to 50 milliatoms-grams of aluminum, and 16.65 milliatoms-grams active oxygen in the form of 20.46 grams alpha-chlorocaproyl peroxide in a hexane solution titrated at 1.3 grams active oxygen per 100 grams of solution.

The operation is stopped after 6 hours. 31 grams of resin are recovered, corresponding to an average hourly rate of 1%.

EXAMPLE 27

Example 13 is repeated but with the monochloroacetyl triisobutylaluminum peroxide system replaced by a catalytic system formed of 9.9 grams triisobutyl aluminum, corresponding to 50 milliatoms-grams of aluminum and 16.65 milliatoms-grams active oxygen, in the form of 20.46 grams alpha-chlorolauroyl peroxide in hexane solution, titrated at 1.3 grams active oxygen in 100 grams of solution.

The operation is stopped after 6 hours. 25 grams of resin are recovered, corresponding to an average hourly rate of transformation of 0.8%.

EXAMPLE 28

Example 13 is repeated but with the monochloroacetyl triisobutyl aluminum peroxide system replaced by the catalyst system formed of 9.9 grams triisobutyl aluminum, corresponding to 50 milliatoms-grams of aluminum and 16.65 milliatoms-grams active oxygen in the form of 20.46 grams alpha alpha-dichloropropionyl in hexane solution, titrated at 1.3 grams active oxygen in 100 grams of solution.

The operation is stopped after 6 hours. 38 grams of resin are recovered, corresponding to an hourly rate of transformation of 1.3%.

EXAMPLE 29

3 kilograms of liquid vinyl chloride at 20° C. are placed in a stainless steel autoclave having a capacity of 10 liters and provided with an anchor type agitator and a double jacket through which a cooling fluid is circulated. After degassing 100 grams vinyl chloride, the monomer is cooled to −40° C. and the following ingredients are added: 43.5 milliatoms-grams active oxygen in the form of 23.2 grams of monochloroacetyl peroxide solution having the titer indicated in Example 1 and then 19.8 grams triethyl aluminum, corresponding to 174 milliatoms-grams of aluminum.

After 7 hours of polymerization, 764 grams of resin are recovered, corresponding to an average hourly rate of transformation of 3.8%.

A measurement of the Vicat softening temperature, taken on a sample of the resin obtained after washing and drying, gives a Vicat point of 98° C.

EXAMPLE 30

500 grams vinyl chloride at −15° C. are introduced into the autoclave of Example 1. After degassing 50 grams vinyl chloride, the autoclave is cooled to −20° C. and 50 grams vinyl acetate are introduced, corresponding to a vinyl chloride; vinyl acetate ratio of 90:10 by weight. Subsequently the following ingredients are placed in the autoclave with a hypodermic syringe, namely 12.5 milligrams active oxygen, in the form of 6.66 grams of monochloroacetyl peroxide solution having the titer shown in Example 1, and then 1.425 grams triethyl aluminum, corresponding to 12.5 milliatoms-grams aluminum.

After 6 hours of copolymerization, 105 grams of resin are recovered which corresponds to an average hourly conversion of 3.5%.

The copolymer obtained contains 96.5% by weight vinyl chloride and 3.5% by weight vinyl acetate. The Vicat softening temperature, taken on a sample of the copolymer after washing and drying, gives a Vicat point of 92° C. The intrinsic viscosity of the copolymer at 70° C. in cyclohexanon is 272 milliliters/gram.

It will be noticed that the Vicat point of the copolymer is higher than that of the classical vinyl chloride/vinyl acetate copolymers.

EXAMPLE 31

500 grams vinyl chloride at −15° C. are introduced into the 1 liter autoclave of Example 1. After degassing 50 grams of vinyl chloride, the autoclave is cooled to −20° C. and then 50 grams propylene are introduced, corresponding to a vinyl chloride: propylene ratio of 90:10 by weight. Subsequently there are introduced with a hypodermic syringe 12.5 milliatoms-grams active oxygen in the form of 6.66 grams of monochloroacetyl peroxide solution having the titer indicated in Example 1 and then 1.425 grams triethyl aluminum, corresponding to 12.5 milliatoms-grams of aluminum.

After 6 hours of copolymerization, 80.7 grams of resin are recovered which corresponds to an average hourly yield of 2.69%.

The copolymer obtained contains 91.5% by weight vinyl chloride and 8.5% by weight propylene equivalents. A measure of the Vicat softening temperature, taken on a sample of copolymer after washing and drying, gives a Vicat point of 86° C. The intrinsic viscosity of the copolymer at 70° C. in cyclohexanon is 131 milliliters/gram. The copolymer obtained contains a high percentage of propylene in the chain.

EXAMPLE 32

At −20° C., 10 grams (86 millimoles) trifluorochloroethylene and 10 grams (160 millimoles) of vinyl chloride are placed in a glass tube under nitrogen. Addition is made of 0.5 milliatoms-grams active oxygen, in the form of 266 mg. of the monochloroacetyl peroxide solution having a titer indicated in Example 1, and then 228 mg. triethyl aluminum, corresponding to 2 milliatoms-grams of aluminum.

After copolymerization for 4½ hours, the contents of the tube are poured into 10 grams methanol and the copolymer is dried. 4.9 grams of dry product are obtained having an intrinsic viscosity of 82.5 ml./gram at 70° C. in cyclohexanon.

The elementary quantitative analysis shows that the copolymer contains 12.45% by weight fluorine, which corresponds to 15.45 moles of trifluorochloroethylene transformed per 100 moles of monomer.

EXAMPLE 33

550 grams of liquid vinyl chloride at 20° C. are introduced into the autoclave of Example 1 and after degassing 50 grams of vinyl chloride and cooling the monomer under nitrogen to −40° C., the following ingredients are introduced into the autoclave with a hypodermic syringe: 12.5 milliatoms-grams active oxygen in the form of 6.66 grams of the monochloroacetyl peroxide solution having the titer indicated in Example 1, and then 50 milliatoms-grams of aluminum in the form of diisobutyl aluminum hydride.

The polymerization is stopped after 5 hours. 18 grams of resin are recovered, corresponding to an average hourly rate of transformation of 0.72%.

EXAMPLE 34

Example 33 is repeated but with the 50 milliatoms-grams of aluminum, in the form of diisobutyl aluminum hydride, being replaced with 50 milliatoms-grams of aluminum in the form of an equimolar mixture of diethyl aluminum and triethyl aluminum hydride.

Polymerization is stopped after 2 hours. 11 grams of resin are recovered which corresponds to an average hourly conversion rate of 1.1%.

EXAMPLE 35

Example 33 is repeated but with the diisobutyl aluminum hydride replaced with 50 milliatoms-grams of aluminum in the form of diethylchloro aluminum.

The polymerization is stopped after 2 hours and 10 minutes. 12 grams of resin are recovered, corresponding to an average hourly rate of transformation of 1.1%.

EXAMPLE 36

550 grams of liquid vinyl chloride at 20° C. are introduced into the autoclave of Example 1. After degassing 50 grams of vinyl chloride and cooling the monomer under nitrogen to −15° C., addition is made of 2 milliatoms-grams of active oxygen in the form of 1.06 grams of monochloroacetyl peroxide solution, having the titer indicated in Example 1, and then 8 milliatoms-grams of aluminum in the form of diethylchloroaluminum.

The polymerization is stopped after 3 hours and 45 minutes. 29 grams of resin are recovered, corresponding to an average hourly output of 1.54%.

It will be understood that changes may be made in the details of formulation and operation without departing from the spirit of the invention, especially as defined in the following claims.

I claim:

1. The method for preparing polymers and copolymers of vinyl chloride by polymerization of a monomeric composition comprising predominantly vinyl chloride in bulk at a temperature within the range of −100° C. to +20° C. in the absence of oxygen and in the presence of a catalyst system comprising an alpha halogenated diacyl peroxide in an amount expressed in active oxygen within the range of 0.0005% to 0.2% by weight of the monomeric composition, and an organoaluminum compound in an amount expressed in milliatoms-grams of aluminum within the range of 0.001 to 50 per milliatoms-grams of active oxygen, in which the alpha halogenated diacyl peroxide corresponds to the formula

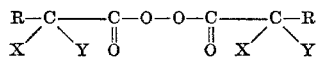

in which X is a halogen atom selected from the group consisting of fluorine, chlorine, bromine and iodine, Y is selected from the group consisting of a hydrogen atom and a halogen atom selected from the group consisting of fluorine, chlorine, bromine and iodine, and R is selected from the group consisting of a hydrogen atom, an unsubstituted or a halogenated hydrocarbon radical selected from the group consisting of saturated or unsaturated aliphatic containing from 1 to 10 carbon atoms, cycloalkane, cycloalkene, aromatic and heterocyclic radical with or without one or more different substituents, and in which the organoaluminum compound is represented by the formula

in which $R_1$ is selected from the group consisting of saturated aliphatic radical and ramified saturated aliphatic radical, containing from 1 to 12 carbon atoms, and $R_2$ and $R_3$ are selected from the group consisting of a hydrogen atom, a halogen atom selected from the group consisting of fluorine, chlorine, bromine and iodine, a saturated aliphatic radical and a ramified aliphatic radical having from 1 to 12 carbon atoms.

2. The method as claimed in claim 1 in which the polymerization or the copolymerization is carried out at a temperature within the range of −80° C. to +10° C.

3. The method as claimed in claim 1 in which the peroxide catalyst copolymer is present in an amount within the range of 0.001% to 0.1% calculated on the weight of active oxygen to monomer and in which the organoaluminum compound is present in an amount within the range of 0.02 to 15 milliatoms-grams of aluminum per milliatoms-grams of active oxygen.

4. The method as claimed in claim 1 in which, when $R_2$ and $R_3$ are halogen, they are selected from the group consisting of fluorine, chlorine, bromine and iodine.

5. The method as claimed in claim 1 in which the halogenated alpha-diacyl peroxide is selected from the group consisting of the peroxide of monochloroacetyl, alpha-chlorolauroyl, alpha-alpha-dichloropropionyl and alpha-chlorocaproyl.

6. The method as claimed in claim 1 in which the organo aluminum compound is selected from the group consisting of triethyl aluminum, tripropyl aluminum, triisobutyl aluminum, triisohexyl aluminum, diethyl aluminum hydride, chlorodiethyl aluminum, dichloromonoethyl aluminum and diisobutyl aluminum hydride.

7. The method as claimed in claim 1 in which the halogenated alpha-diacyl peroxide is employed in an amount, expressed in active oxygen, within the range of 0.001% to 0.1% by weight in relation to the weight of the monomer.

8. The method as claimed in claim 1 in which the organo aluminum compound is present in an amount, expressed in milliatoms-grams of aluminum, within the range of 0.02 to 15 per milliatoms-grams of active oxygen.

9. The method as claimed in claim 1 in which the ratio of active oxygen atoms of the halogenated alpha-peroxide to the aluminum atoms of the organo aluminum compound is about 3/4 when the polymerization or copolymerization is carried out at about −20° C. in the presence of the triethyl aluminum monochloroacetyl peroxide system.

10. The method as claimed in claim 1 in which the ratio of active oxygen atoms of the halogenated alpha-peroxide to the aluminum atoms of the organo aluminum compound is about 1/4 when the polymerization or copolymerization is carried out at a temperature of about −40° C. in the presence of the monochloroacetyl triethyl aluminum peroxide system.

11. The method as claimed in claim 1 in which, when the vinyl chloride is copolymerized with a comonomer, the comonomer is selected from the group consisting of propylene, ethylene, butene, acrylonitrile, vinyl acetate, vinylidene chloride, styrene, and trifluorochloroethylene.

References Cited
UNITED STATES PATENTS

| | | | |
|---|---|---|---|
| 2,559,630 | 7/1951 | Bullitt | 260—610 |
| 2,792,423 | 5/1957 | Young et al. | 260—610 |
| 3,089,865 | 5/1963 | Walther et al. | 260—87.1 |

HARRY WONG, Jr., Primary Examiner

U.S. Cl. X.R.

260—87.1, 87.5, 87.7, 92.8